UNITED STATES PATENT OFFICE.

WILLIAM ERASTUS WILLIAMS, OF CHICAGO, ILLINOIS.

CHEWING-GUM COMPOSITION.

1,052,872.	Specification of Letters Patent.	Patented Feb. 11, 1913.

No Drawing.	Application filed May 13, 1911. Serial No. 627,045.

*To all whom it may concern:*

Be it known that I, WILLIAM ERASTUS WILLIAMS, a citizen of the United States, residing at Chicago, in the county of Cook and State of Illinois, have invented a new and useful Chewing-Gum Composition, of which the following is a specification.

Gum chewers easily notice even a slight difference between the several grades of gum, as in the chewing, the tongue has all the time that is needed to perceive slight differences.

The ordinary commercial chewing gum of to-day is composed of some gum or pitch for a base to which there are added various forms of confection, such as sugar, glucose, etc., together with the desired flavoring, and there is often added some material, such as paraffin, butter or greasy material, or starch, to prevent the gum from sticking to the mouth. Most of the gum now used has chicle for the gum base, but other gums are used. In the high class chicle gums the confection part, such as the sugar, glucose, and flavoring materials compose about three-fourths of the whole, measured by the weight, so that after chewing the gum to the point of the disappearance of the taste and flavor there remains in the form of the chicle about twenty-five per cent. of the original weight. In the gums where starch and digestible fats are used to shorten the gum, or to prevent its sticking, the saliva of the mouth acts on these things and to a certain extent makes them soluble and then they disappear causing the gum to lose some or all of its shortening.

I prefer to use in my gum a small amount of charcoal amounting to about one per cent. in weight of the net weight of chicle or insoluble gum, about one-fourth of one per cent. of the total weight of the stick of gum as purchased. This charcoal must not be too finely divided else it will act only as a coloring matter and make the gum black or dark in color, which is a serious objection. And further if the charcoal is too finely divided or too much of it is used, it is apt to color the lips and tongue in chewing, which is also a serious objection. If too much charcoal is used, it causes the gum to become too short and it also grates on the teeth; but just enough and the right quality of charcoal gives the gum a texture such that in chewing, it appears more like an article of food under the teeth, giving the effect of total disintegration, and a satisfactory sensation like the mastication of a good food article.

In the preparation of my gum I prefer to use a charcoal made of grain, such as wheat, and in its preparation I use a good quality of thoroughly cleaned wheat as free from grit as possible. I then place this in a retort, like a gas retort, and drive off all the volatile products, bringing the temperature of the retort and its contents up to a good red heat. In this treatment the grains of wheat in the charcoal form retain about their normal size and they are very porous, and when broken up, for mixing with the gum, there appears to be insufficient soluble matter or dust to cause a discoloration of the mouth even when this charcoal is chewed by itself. With the charcoal made of wood there appears to be a soluble coloring matter that is objectionable as compared with my grain charcoal. The grain charcoal being so very porous, a small amount of it becomes a good absorbent material and in the gum becomes a polishing material for the teeth and a hygienic agent for the person chewing it. This charcoal of the grain, in the quantity mentioned, mixes in the gum in such particles that they may be seen in the gum as separate particles and yet they do not cause a gritty sensation that is objectionable. Yet it becomes not only an efficient hygienic agent, but it adds to the quality of the gum, as described, by giving a gratifying sensation in chewing and a freedom from stickiness not otherwise obtained.

I am aware that various materials have been compounded with gum for various purposes, among them being parched bran, but a material of this sort when acted upon in chewing the gum has the effect of breaking up the gum particles in such a way that they are carried off in the confection part of the gum and thus a person unintentionally swallows the larger part, if not all the gum, along with the confection part. This effect will also be brought about, to some extent, if I fail to fully char the wheat used in making my charcoal since then some considerable soluble material remains to combine with the confection material. I am also aware that carbon gums, such as asphaltum and mineral carbon, have been used with chewing gums.

Instead of grain from which to make my charcoal, I may use starch or grain products, or white crystal sugar.

What I claim is:

Chewing gum having charcoal in granular form made from grain or kindred products incorporated therewith.

In witness whereof I have hereunto subscribed my name on this fifth day of May, 1911, in the presence of two subscribing witnesses.

WILLIAM ERASTUS WILLIAMS.

Witnesses:
C. A. ROPER,
F. C. MILLER.